United States Patent
Mueller et al.

(10) Patent No.: US 11,410,068 B2
(45) Date of Patent: Aug. 9, 2022

(54) QUANTUM PROCESSING SYSTEM INCLUDING A MODULATED RF GENERATOR WITH SYNCHRONIZED COMPONENTS

(71) Applicant: International Business Machines Corporation, Armonk, NY (US)

(72) Inventors: Peter Mueller, Zurich (CH); Thomas Morf, Gross (CH)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 16/260,290

(22) Filed: Jan. 29, 2019

(65) Prior Publication Data
US 2020/0034736 A1  Jan. 30, 2020

Related U.S. Application Data

(60) Provisional application No. 62/711,641, filed on Jul. 30, 2018.

(51) Int. Cl.
*G06F 1/04* (2006.01)
*G06N 10/00* (2022.01)
*G06F 1/02* (2006.01)

(52) U.S. Cl.
CPC ............ *G06N 10/00* (2019.01); *G06F 1/022* (2013.01); *G06F 1/04* (2013.01)

(58) Field of Classification Search
CPC ........... G06F 1/022; G06F 1/04; G06N 10/00; G06N 10/40
See application file for complete search history.

(56) References Cited

U.S. PATENT DOCUMENTS

| | | | |
|---|---|---|---|
| 2012/0124432 A1* | 5/2012 | Pesetski | B82Y 10/00 714/E11.018 |
| 2015/0032994 A1* | 1/2015 | Chudak | G06N 10/00 712/42 |

(Continued)

FOREIGN PATENT DOCUMENTS

| | | |
|---|---|---|
| JP | 2011209725 A | 10/2011 |
| WO | 2016/133394 A1 | 8/2016 |
| WO | 2018/063206 A1 | 4/2018 |

OTHER PUBLICATIONS

Ryan, C.A., et al., "Hardware for Dynamic Quantum Computing", arXiv:1704.08314v1, Apr. 26, 2017, pp. 1-13.

(Continued)

*Primary Examiner* — Levi Gannon
(74) *Attorney, Agent, or Firm* — Scully, Scott, Murphy & Presser, P.C.; Erik K. Johnson

(57) ABSTRACT

A quantum processing system may include one or more superconducting qubits and a qubit controller for controlling the one or more qubits. The qubit controller includes a radio frequency generation unit comprising electronic components, which are altogether configured to generate modulated RF signals. The controller also includes a phase locked loop unit maintaining a reference clock for two or more of the components of the RF generation unit, and a timing controller including an absolute timing register, the latter accessed by the reference clock, in operation. The qubit controller comprises a sequencer coupled to the timing controller to synchronize said two or more of said components by maintaining a coherent signal for said two or more of said components, the coherent signal phase matched to the one or more qubits, to drive and/or read out the one or more qubits via modulated signals generated by the synchronized components, in operation.

20 Claims, 6 Drawing Sheets

(56) References Cited

U.S. PATENT DOCUMENTS

| | | | |
|---|---|---|---|
| 2018/0075901 A1 | 3/2018 | Frank | |
| 2019/0235031 A1* | 8/2019 | Ibrahim | G01R 33/24 |
| 2020/0266234 A1* | 8/2020 | Boothby | H01G 4/33 |
| 2020/0295525 A1* | 9/2020 | Maker | H03L 7/099 |

OTHER PUBLICATIONS

SJ Electronics, "Overcoming RF Signal Generation Challenges in Quantum Computing with New DAC Technologies", White Paper, https://www.sjelectronics.co.uk/media/applications-area/tektronix/overcoming-rf-signal-generation-challenges-quantum, Accessed on Jan. 18, 2019, 12 pages.

Ramyar, D., "Extensible Hardware for Control of Superconducting Qubits" University of Copenhagen, Faculty of Science, Bachelor Thesis, Jun. 11, 2017, 35 pages.

Koch, J., et al., "Charge insensitive qubit design derived from the Cooper pair box", arXiv:cond-mat/0703002v2, Sep. 26, 2007, 21 pages.

Patra, B., et al., Cryo-CMOS Circuits and Systems for Quantum Computing Applications, IEEE Journal of Solid-State Circuits, Jan. 2018, pp. 309-321, vol. 53, No. 1.

Corcoles, A.D., et al., "Demonstration of a quantum error detection code using a square lattice of four superconducting qubits", Nature Communications, Accepted Mar. 18, 2015, Published Apr. 29, 2015, 10 pages.

Devoret, M.H., et al., "Superconducting Qubits: A Short Review", arXiv:cond-mat/0411174v1, Nov. 7, 2004, Feb. 2, 2008, 41 pages.

Sebastiano, F., et al. ,"Invited Cryo-CMOS Electronic Control for Scalable Quantum Computing", DAC '17, Jun. 18-22, 2017, 6 pages.

Vandersypen, L., "Quantum Computing—The Next Challenge in Circuit and System Design", 2017 IEEE International Solid-State Circuits Conference, Feb. 6, 2017, pp. 24-29, Session 1.

"Fundamentals of Direct Digital Synthesis (DDS)", Analog Devices MT-085 Tutorial, http://www.analog.com/media/en/training-seminars/tutorials/MT-085.pdf, Accessed on Jan. 18, 2019, 9 pages.

Wallraff, A., et al., "Strong coupling of a single photon to a superconducting qubit using circuit quantum electrodynamics", Nature, Sep. 2004, pp. 162-167, vol. 431.

Fink, J.M., et al., "Quantum-To-Classical Transition in Cavity Quantum Electrodynamics", Physical Review Letters, Week ending Oct. 15, 2010, pp. 163601-1-16301-4, PRL 105.

Mueller, P., et al., "Hierarchical System Synchronization and Signaling for High-Performance—Low-Latency Interconnects", 2005 IEEE International Conference on Electro Information Technology, Jun. 2005, 6 pages.

Miller, B., "Multiple Modulator Fractional Divider", IEEE Transactions on Instrumentation and Measurement, Jun. 1991, pp. 578-583, vol. 40, No. 3.

\* cited by examiner

QUANTUM PROCESSING SYSTEM INCLUDING A MODULATED RF GENERATOR WITH SYNCHRONIZED COMPONENTS

BACKGROUND

The present disclosure relates in general to the field of quantum processing systems and in particular to a system comprising a qubit controller that includes a modulated radio frequency generator for controlling superconducting qubits of the system.

Recent advances in quantum computing are making such a technology ever more relevant to industrial applications. Quantum computing makes direct use of quantum-mechanical phenomena, such as superposition and entanglement to perform operations on entangled quantum bits (qubits), i.e., information stored in quantum states. Superconducting circuits are relatively easy to manufacture with current technologies and are thus promising candidates to further scale quantum information technologies. Today, it can be envisioned that in the near term a small quantum computer, based on a couple of hundreds of superconducting qubits with error mitigation or limited error correction, will be able to simulate quantum systems intractable to conventional computers.

Particularly promising quantum computing devices are based on superconducting qubits of the transmon type. Such qubits are controlled by radio frequency (RF) technology.

RF signal generators are used in a variety of applications, starting with wireless technologies such as cellular communications, GPS and WiFi. Modulated RF generators typically use arbitrary waveform generators (AWGs). RF generators may for example be used to generate a local (LO) radio frequency signal (also called carrier frequency). The LO signal may for instance be modulated in frequency, amplitude and/or phase.

SUMMARY

According to a first aspect, the present invention is embodied as a quantum processing system. The system comprises one or more superconducting qubits (e.g., fixed-frequency qubits of the transmon type) and may comprise additional RF-controlled components, such as tunable couplers. The system further includes a qubit controller for controlling the one or more superconducting qubits, as well as, e.g., said additional RF-controlled components. The qubit controller includes a radio frequency generation unit, or RF generation unit, comprising electronic components configured to generate modulated radio frequency signals, or modulated RF signals. The controller further includes a phase locked loop unit configured to maintain a reference clock for two or more of said electronic components of the RF generation unit, as well as a timing controller including an absolute timing register, the latter accessed by the phase locked loop unit for maintaining said reference clock, in operation. In addition, the controller comprises a sequencer coupled to the timing controller to synchronize said two or more of the components by maintaining a coherent signal therefor, the coherent signal phase matched to the one or more qubits, so as for the qubit controller to drive and/or read out said qubits via modulated signals generated by the synchronized components, in operation.

The RF generation unit in some embodiments comprises, as part of said electronic components, a single digital RF generator configured to generate RF signals, based on which said modulated RF signals are generated by the RF generation unit, in operation.

The quantum processing device may comprise two or more qubits, and, the sequencer may be further adapted to synchronize said components, so as for the modulated signals generated by the RF generation unit to drive and/or read out the two or more qubits time interleaved.

In embodiments, the RF generation unit further comprises, as part of said components and in addition to said single digital RF generator: a digital in-phase/quadrature sideband modulator, coupled to the digital RF generator to modulate the RF signals generated by the latter in phase, frequency, and amplitude; and a digital-to-analog converter, coupled to the digital in-phase/quadrature sideband modulator to convert signals modulated by the later and thereby allow the qubit controller to drive and/or read out the one or more qubits, in operation.

In some embodiments, the RF generation unit further comprises, as part of said components, a hardware-implemented, real-time in-phase/quadrature modulation state machine, or I/Q modulation state machine, the latter coupled to the sideband modulator. This I/Q modulation state machine may for instance be controlled by a real-time processing unit, as discussed below.

The sequencer may be configured to synchronize said components by instructing the I/Q modulation state machine to generate, via the sideband modulator, I/Q waveforms used by the qubit controller to drive and/or read out the one or more qubits, in operation.

The RF generation unit may comprise a numerically controlled oscillator (e.g., designed so as to be reconfigurable on-the-fly), which is connected to the sideband modulator. This oscillator too may possibly be controlled by a real-time processing unit.

In fact, the qubit controller may include a real-time processing unit that implements each of the phase locked loop unit, the timing controller, and the sequencer. As known, a real-time processing system is a system whose computational outputs are based on both values and time. Thus, its correctness not only depends on values (operands) but also on time, contrary to classical systems. In the present case, the real-time processing unit may for instance include a real-time core. The real-time unit allows the units it implements to operate in real time. In particular, the sequencer may operate commands and distribute instructions to other, connected components in real time. In particular, the sequencer (as implemented by the real-time processing unit) may advantageously be designed to operate in real time on the time base of distributed system clocks and phases.

The system may additionally include an application programming interface, as in embodiments discussed in the next section.

In terms of hardware implementations, the components of the RF generation unit may notably be implemented as discrete logic components, field programmable gate arrays, and/or dedicated gate arrays. The qubit controller, in some embodiments, may be itself implemented as a single, integrated circuit chip.

According to another aspect, the present invention can be embodied as a method for controlling a quantum processing system, the latter comprising one or more superconducting qubits. Note, the system may also comprise additional RF-controlled components, as noted earlier. This method revolves around the following steps, each implemented at a qubit controller. To start with, modulated radio frequency (RF) signals are generated via electronic components of a RF generation unit. A reference clock is maintained for two or more of said electronic components by accessing an absolute timing register. Said two or more of said components are synchronized by maintaining a coherent signal therefor, the coherent signal phase matched to the one or more qubits. Said qubits can accordingly be controlled and/or read out via modulated signals generated by the synchronized components.

As noted earlier, said reference clock can be maintained by a phase locked loop unit. Moreover, said two or more of said components can be synchronized by a sequencer coupled to a timing controller that includes the absolute timing register.

Again, the quantum processing device may likely comprise two or more qubits. In such cases, two or more of the components of the RF generation unit can advantageously be synchronized so as for the modulated signals generated by the RF generation unit to drive and/or read out the two or more qubits, time interleaved.

Said components in some embodiments are synchronized by instructing a hardware-implemented, real-time in-phase/quadrature modulation state machine to generate, via a digital in-phase/quadrature sideband modulator, I/Q waveforms used by the qubit controller to drive and/or read out the one or more qubits. More generally, the qubit controller may possibly include a real-time processing unit, so as for the qubit controller to operate in real time.

Devices, apparatuses, and systems embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

Figure 1:
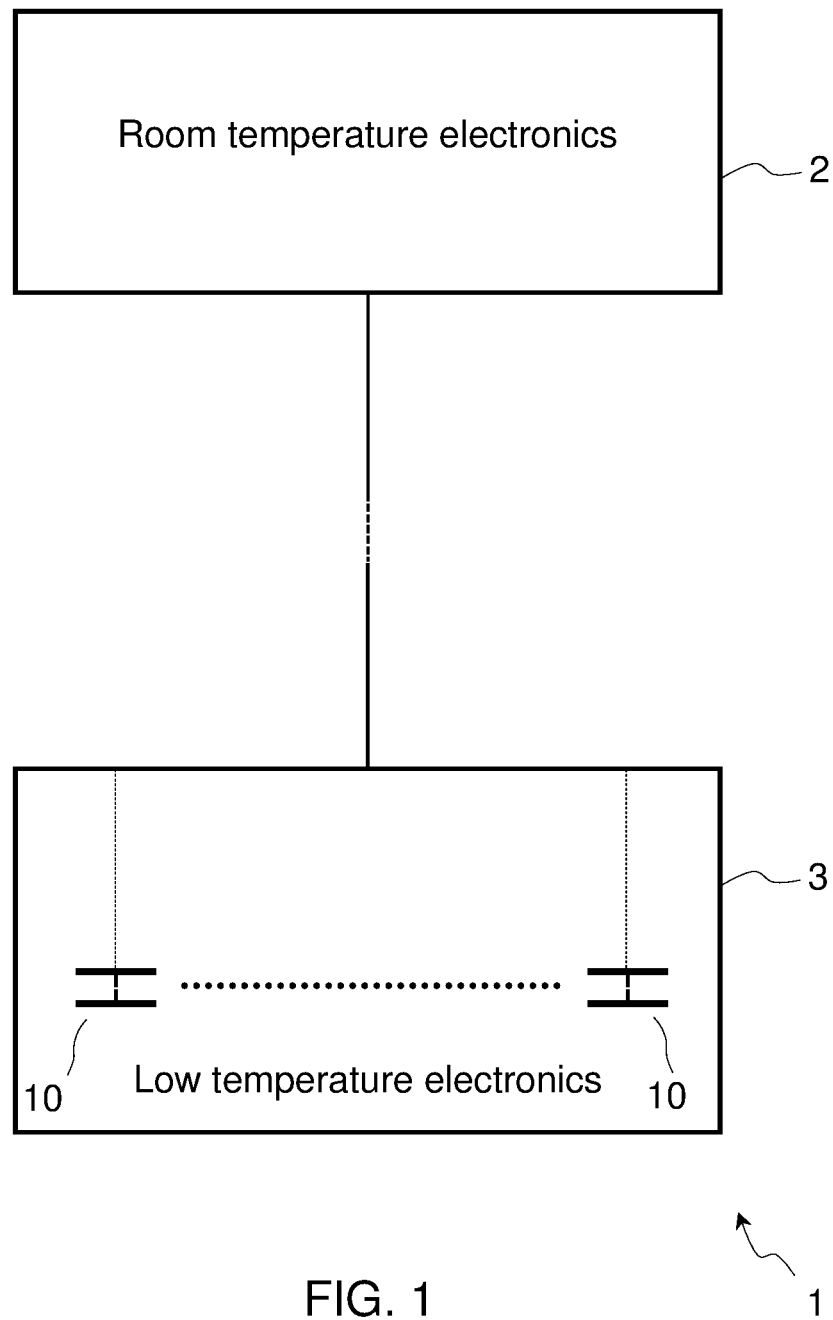
FIG. 1 illustrates overall system architecture, including room temperature electronics and low temperature electronics, such as depicted in FIGS. 2 and 3, respectively, and according to embodiments. I.e.

The accompanying drawings show simplified representations of devices or parts thereof, as involved in embodiments.

DETAILED DESCRIPTION OF EMBODIMENTS OF THE INVENTION

Existing modulated RF generators rely on functionalities of the receiving entity, such as phase locked loops (PLLs) and protocols to synchronize and transfer information. A qubit as receiver does not have such functionalities. Therefore, common modulated RF generators and standard telecommunications equipment for qubit systems need be externally synchronized and controlled, which makes it difficult to achieve a satisfactory level of integration and control signal quality.

The apparatuses and systems proposed herein rely on RF generators that are not only synchronized to a periodic reference clock, but also to an absolute system time reference. This allows the RF generation unit to act as a remote PLL and control (protocol) handler for qubits in a complex environment. The absolute system time scheme is ideal for the application to large scale superconducting qubit hardware, such as quantum computers and other quantum processing systems. This makes it possible to achieve improved control on each individual qubit as well as a set of qubits (e.g., to implement multi-qubit gates).

Quantum computing devices including many qubits, such as superconducting transmons, are controlled by RF technology. As it may be realized, this has a certain similarity with techniques known in the field of wireless and cellular communications technology. In telecommunications, the method usually includes (on the transmitter side) an RF local (LO) signal, the so-called carrier, which is quadrature (I/Q) modulated with control protocol and user information to be transferred. The receiving party includes a PLL which locks on the carrier signal. I/Q demodulation allows the original control protocol and user information to be retrieved. Such a scheme is insensitive to even dynamic changes of distance between the transmitter and the receiver, and works very well bidirectionally.

As it may be realized, however, such a scheme cannot be directly applied to communications with qubits. Indeed, a qubit can be regarded as a "passive element" because it cannot lock on the carrier signal nor is able to process a protocol. However, in the framework of quantum electro dynamics (QED), a qubit can be described as a configurable, quantized and non-linear resonator. A transmitter is able to transfer information to a qubit by adjusting its RF carrier coherent with the qubit's internal resonance frequency and phase. By means of I/Q modulation (in all frequency, phase and amplitude), one may thus control the configuration of a qubit and/or initiate gate operations including one or more qubits. Since a qubit is not able to drive any output signal, a receiver needs to send the required carrier signal to the qubit readout resonator and let it interact with the qubit, which is strongly coupled to the resonator. The return signal needs to be homodyne or heterodyne demodulated, which results in the I/Q configuration information of the qubit. A qubit is not able to compensate for any distance drifts and it cannot actively send any status information.

Comparing the two applications discussed above (telecommunications and quantum systems), it may be realized that, in order to successfully apply a communication scheme based on modulated RF generators to control qubits, the missing PLL and protocol handler functionalities need be moved from the qubit to the accessing transmitter or receiver.

Based on such observations, the present Inventors came to develop a novel quantum processing system, whose core aspects are now described in detail.

The system in some embodiments comprises one or more superconducting qubits and a qubit controller for controlling the one or more qubits, as well as additional RF-controlled components, such as tunable couplers (i.e., frequency-tunable coupling elements), if any. That is, qubits may possibly be connected to a tunable coupler, e.g., to allow transitions between states of the qubits to be parametrically driven, by modulating the tunable coupler energy. For example, two-qubit gates are known, which are implemented with transmon (fixed-frequency) qubits, where the qubits are coupled via such a frequency-tunable coupler. The latter is typically not meant to be used as a computational qubit. However, a tunable can practically be embodied as a superconducting qubit.

The qubit controller includes a RF generation unit comprising electronic components (e.g., including a modulated RF generator), which are altogether configured to generate modulated RF signals. The controller also includes a PLL unit maintaining a reference clock for two or more of the components of the RF generation unit, as well as a timing controller including an absolute timing register (ATR). This register is accessed by the reference clock, in operation. The PLL unit and the timing controller are typically implemented as a common unit, here called PLL and timing unit (or PTU for short) 23.

Moreover, the qubit controller comprises a sequencer (also referred to as sequencer and instruction unit, or SIU, in embodiments described below) coupled to the timing controller to synchronize components of the RF generation unit by maintaining a coherent signal for such components. Namely, the coherent signal is phase matched to the one or more qubits, so as for the qubit controller to drive and/or read out the one or more qubits via modulated signals generated by the synchronized components, in operation. Note, such a sequencer can be regarded as a simple processor.

Figure 5:
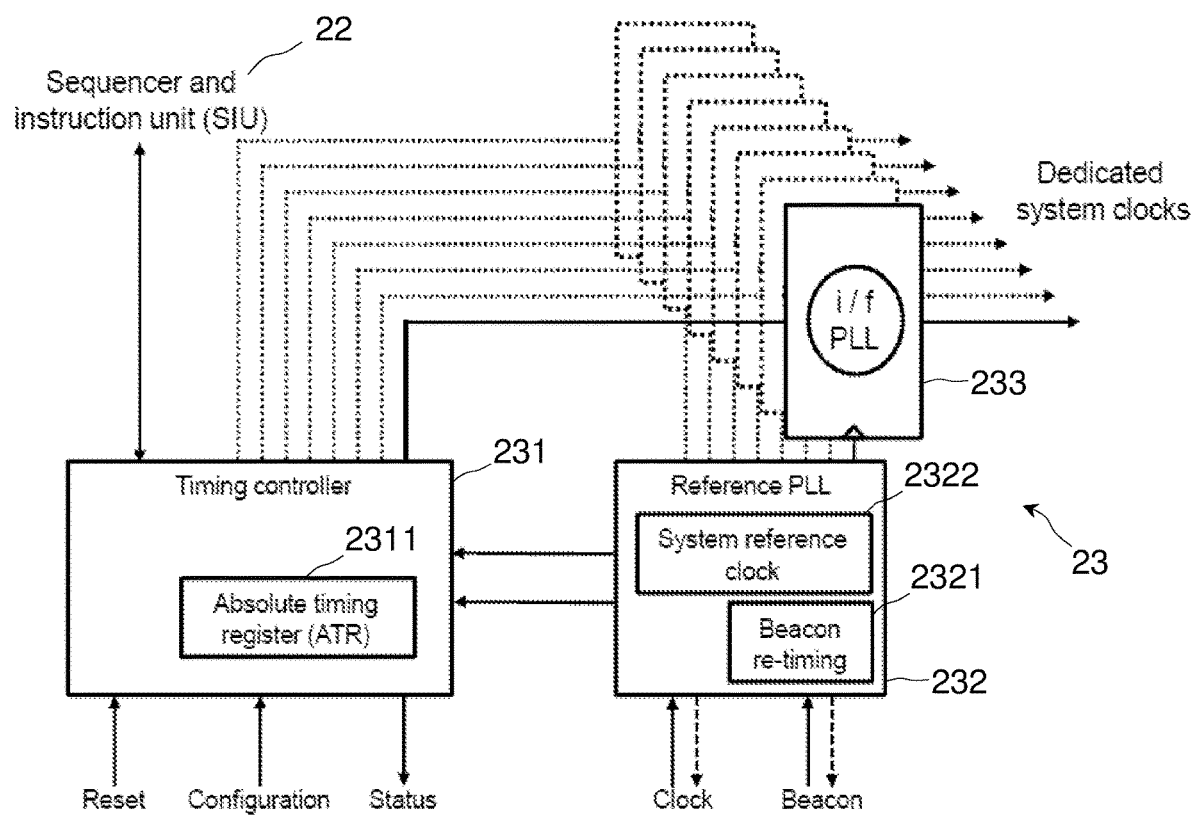
FIG. 5 shows details of the PLL and timing unit of FIG. 4, as in embodiments.

In embodiments, reference PLLs are connected to a single central clock and time reference (see, e.g., the signals "Clock" and "Beacon" in FIG. 5). The ATR is preset via a configuration interface (FIG. 5). Details useful to the understanding of the underlying mechanism can be found in the prior art paper of P. Mueller, U. Bapst and R. Luijten, 'Hierarchical System Synchronization and Signaling for High-Performance—Low-Latency Interconnects', proceedings of IEEE International Conference on Electro Information Technology, 2005, which introduces a centralized method to synchronize and stabilize hardware units over distance. In the present context, the common clock can be used to achieve a system wide coherence, whereas the common ATR can be used to create dynamic range to manipulate the qubits in a defined sequence, e.g., a quantum computing program.

The central clock and time reference can be seen as the root of all the phases in the system. Because the reference clocks and ATRs of all devices in the system are working coherent with that central clock and time reference, it is not only possible to create coherent single qubits, but also to maintain coherence across a set of qubits, a thing that is very difficult to manage in today's quantum computing systems.

Figure 4:
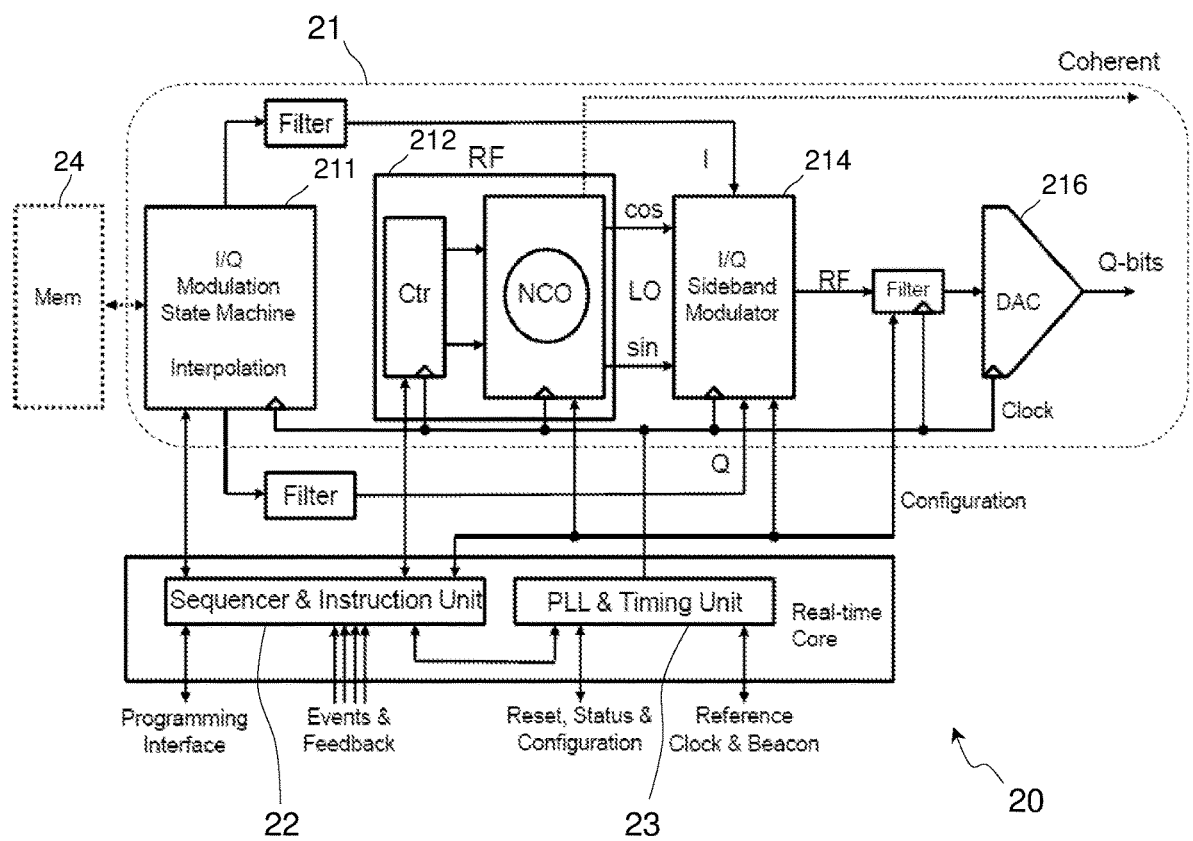
FIG. 4 shows details of the RF generation unit of FIG. 2, as in embodiments. The generator notably includes a PLL and timing unit, as well as a sequencer and instruction unit.

As illustrated in FIG. 4, the RF generation unit may notably comprises (as part of said components): a single digital RF generator for generating RF signals; a digital I/Q sideband modulator, coupled to the RF generator to modulate the RF signals in phase, frequency, and amplitude; and a digital-to-analog converter (DAC), coupled to the modulator to convert signals modulated by the later and thereby drive and/or read out the one or more qubits. Note, the RF generation unit may further comprise additional components, such as digital filters, for example, as assumed in FIG. 4.

All this is now described further in detail, in reference to FIGS. 1 to 6.

Embodiments described below rely on a novel concept to compensate for the missing PLL on qubit side when sending information, and a novel protocol handler to handle multiple qubits. Contrary to existing modulated RF generator applications, a quantum computing device requires an absolute timing reference at the qubit processing device. All control signals to and from the processing device need be adjusted to the reference, in terms of frequencies, phases and protocols. This means, for example, that any drift effects need be pre-compensated (respectively post-compensated), when sending (respectively receiving) information, which can be achieved by moving the PLL functionality from the qubit back to the sender.

The implementation of the novel functions described above can notably be achieved thanks to two main components, here referred to as: (i) a PLL and timing unit (PTU); and (ii) a sequencer and instruction unit (SIU), as described in the following, in reference to specific embodiments.

The PTU 23 shown in FIG. 5 includes a PLL and a high precision absolute time register (ATR). The PLL is locking onto the system wide reference clock, and it clocks the ATR. An external periodical beacon (an integer sub frequency of the reference clock) is used to check the ATR time. If the ATR detects a cycle slip on the base of the beacon, then it removes the locked status signal. If the ATR receives an external reset, then it loads the externally supplied time configuration and waits for the next beacon to restart the absolute time setup. After such a configuration step, the status changes to "locked". The PTU 23 internally supplies (in the modulated RF generator) precision clocks, which are derived from the reference clock, and the ATR. By transferring the "system-wide reference time" (also referred to as "root time") to the ATR, the SIU is able to act as a PLL for the qubit and therefore compensate for drift and other artifacts.

Figure 6:
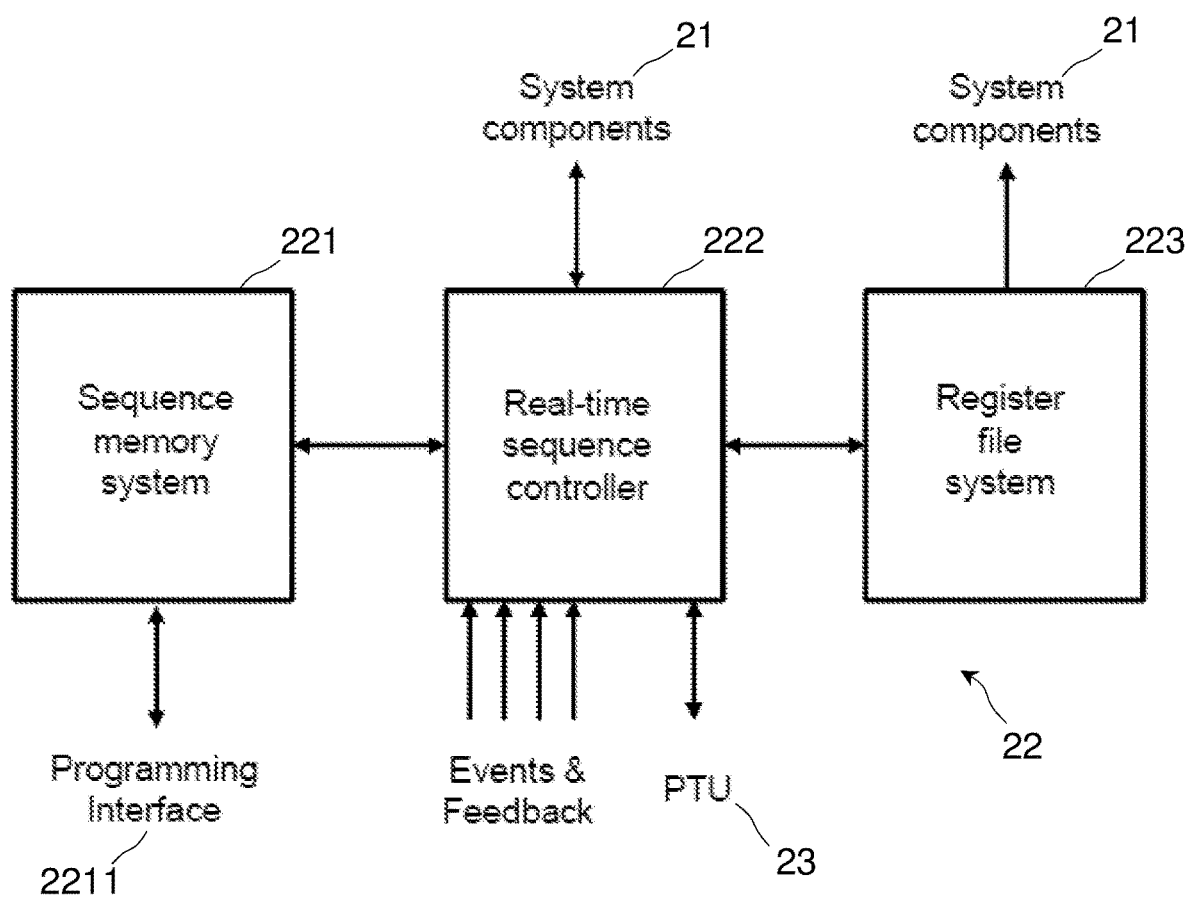
FIG. 6 is a high-level diagram of a sequencer and instruction unit of FIG. 4, as in embodiments.

The SIU hardware depicted in FIG. 6 can be regarded as a programmable state machine (not to be confused with the I/Q modulation state machine 211 of FIG. 5) that controls the multi clock cycle protocols. Its main functions are assumed to be carried out by two connected modules 221 and 222.

The SIU contains a program register containing instructions to configure all the components of the generation unit 21 and its internal clock adjusts to the modulated RF generator. For example, it may send a configuration command to the I/Q modulation state machine 211, which command instructs to create I and Q waveforms for a qubit X-rotation. The command may also include the absolute time (ATR), e.g., indicating when the waveforms need be transferred to the I/Q sideband modulator 214.

The SIU may further set the configuration registers of a numerically controlled oscillator (NCO, see FIG. 4), which contains parameters such as the target frequency, the start phase, the switch over behavior from the currently running frequency and the absolute time (ATR) when a new frequency need be set up.

The SIU 22 may further send configuration parameters, e.g., such as to set the I/Q sideband modulator 214 in a single sideband mode or an output clock and phase to the digital analog converter (DAC) 216.

All the components will start at the accordingly programmed absolute time referenced by the ATR and the phase supplied by the reference PLL. Such a method allows any drift effects and other artifacts to be compensated for a specified qubit.

Advantageously, as the programming 2211 can be interleaved during the operation of the RF generation unit, a seamless multiplexing of gate controls, read-out cycles or even different qubits is possible. The SIU 22 receives events and feedback signals to run instructions, such as qubit error correction cycles or update phase correction registers to dynamically compensate for signal delay drift to a specified qubit.

In the following, an implementation is described, which relies on fixed-frequency, superconducting qubits, for the sake of illustration. However, the one skilled in the art will appreciate that the scope of the present invention is not limited to fixed-frequency qubits. Furthermore, the example of system implementation illustrated in the accompanying drawings assumes a single qubit application. Still, the skilled person may appreciate that the present concepts may also be used to maintain coherent control over a large and/or distributed quantum computing system, including many qubits. In such systems, time division multiplexing may be used to drive several signals and thus several qubits.

More generally, however, one can also work in a frequency multiplexed scheme to access more than one qubit at the same time. Thus, time and/or frequency multiplexing schemes can be contemplated, which may dramatically reduce the need for hardware (e.g., cabling) and hardware control in practice.

Figure 2:
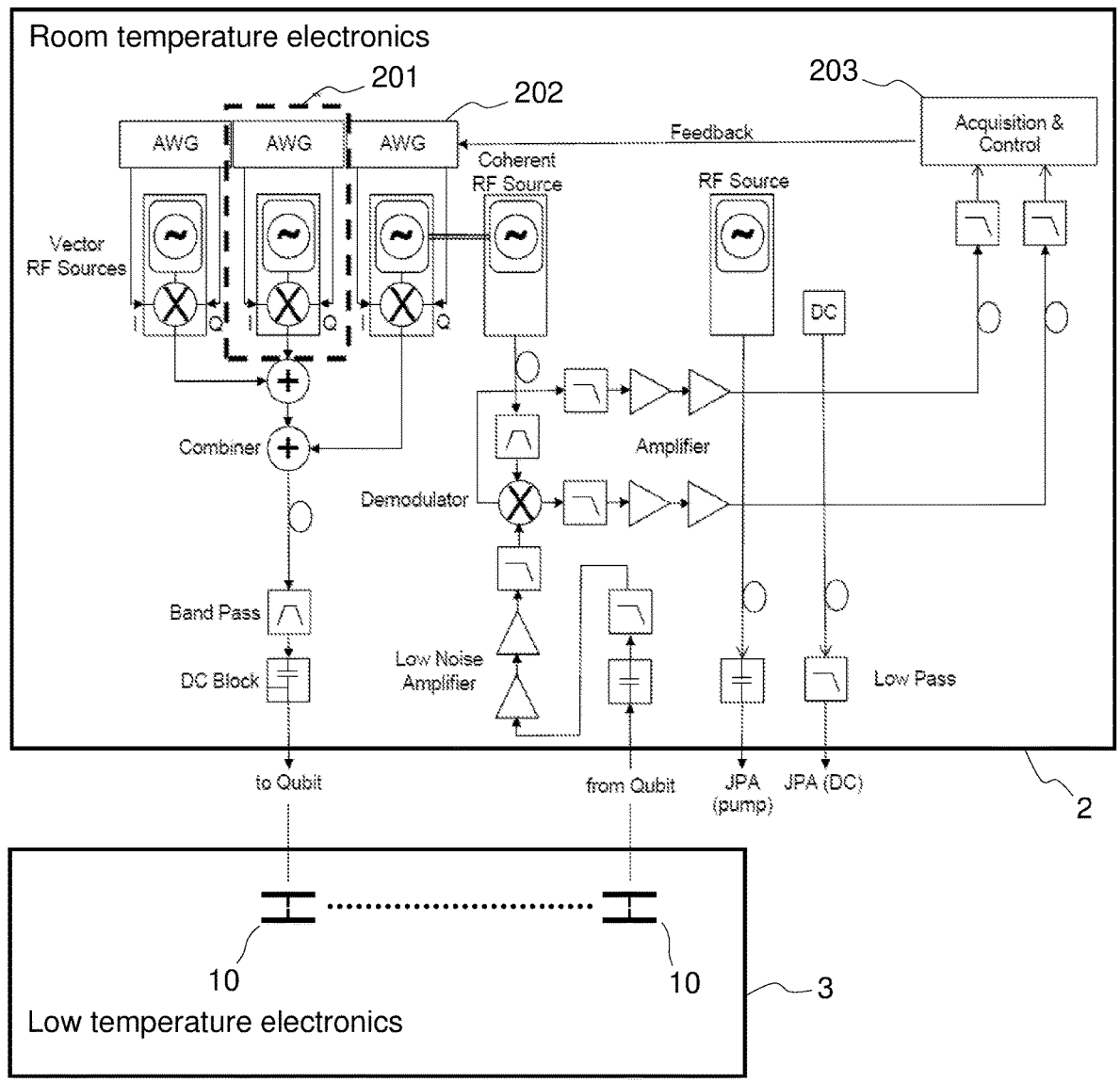
FIG. 2 shows an example of an electronic circuit used at room temperature and FIG. 3 is an example of a complementary electronic circuit (low temperature circuit) as used at the cooling stages, inside a cryostat, as in embodiments.

FIG. 2 shows (on the LHS) possible driving electronics for a single qubit, including two-channel arbitrary waveform generators (AWGs), which can be connected to an I/Q sideband modulator 214 (see FIG. 4) integrated in the vector RF sources. Because of the different resonance frequencies required for a qubit and its coupling resonator, more than one AWG-vector RF source channels are required. These channels are usually added onto a single signal by means of combiners, as assumed in FIG. 2. Note, the dashed, rectangular boxes 201 of FIG. 2 refer to RF generation units (here AWGs combined with vector RF sources). Not all components of such units are shown in FIG. 2. FIG. 4 shows a more detailed implementation of such a RF generation unit, according to embodiments.

As also shown in FIG. 2 (on the path down to 'to qubit'), the RF signals may optionally be filtered, and DC blocked or DC shifted. Further down this path ('to Qubit'), the signals enter the cryostat 3 (the signal path continues on FIG. 3). At the bottom of FIG. 2, 'from qubit' denotes the return signal (from FIG. 3) that can be used to read-out the qubit. The modulated RF signal first passes some optional DC blocks, filters and low noise amplifiers (LNA). In the depicted example, the read-out signal is demodulated by a heterodyne I/Q method. Therefore, an RF source is held coherent with the read-out driving AWG-vector RF source, as shown above the demodulator ('Demodulator'). The demodulator subtracts the RF carrier frequency of the corresponding read-out driving vector RF source from the signal and outputs the I and Q signals. Such signals relate to the two AWG channels of the read-out driving unit, where only the Q signal is used to switch on and off the read-out function.

Depending on whether the qubit is in its ground state or not, a small difference in the amplitude and phase can be obtained in the I/Q plane. This is typically processed in the acquisition and control unit 203, shown in the top-right corner of FIG. 2. This unit may send events back to the AWG-vector RF sources to drive actions, such as qubit error corrections. FIG. 2 shows additional RF sources and a DC source, as may be required inside the cryostat.

Figure 3:
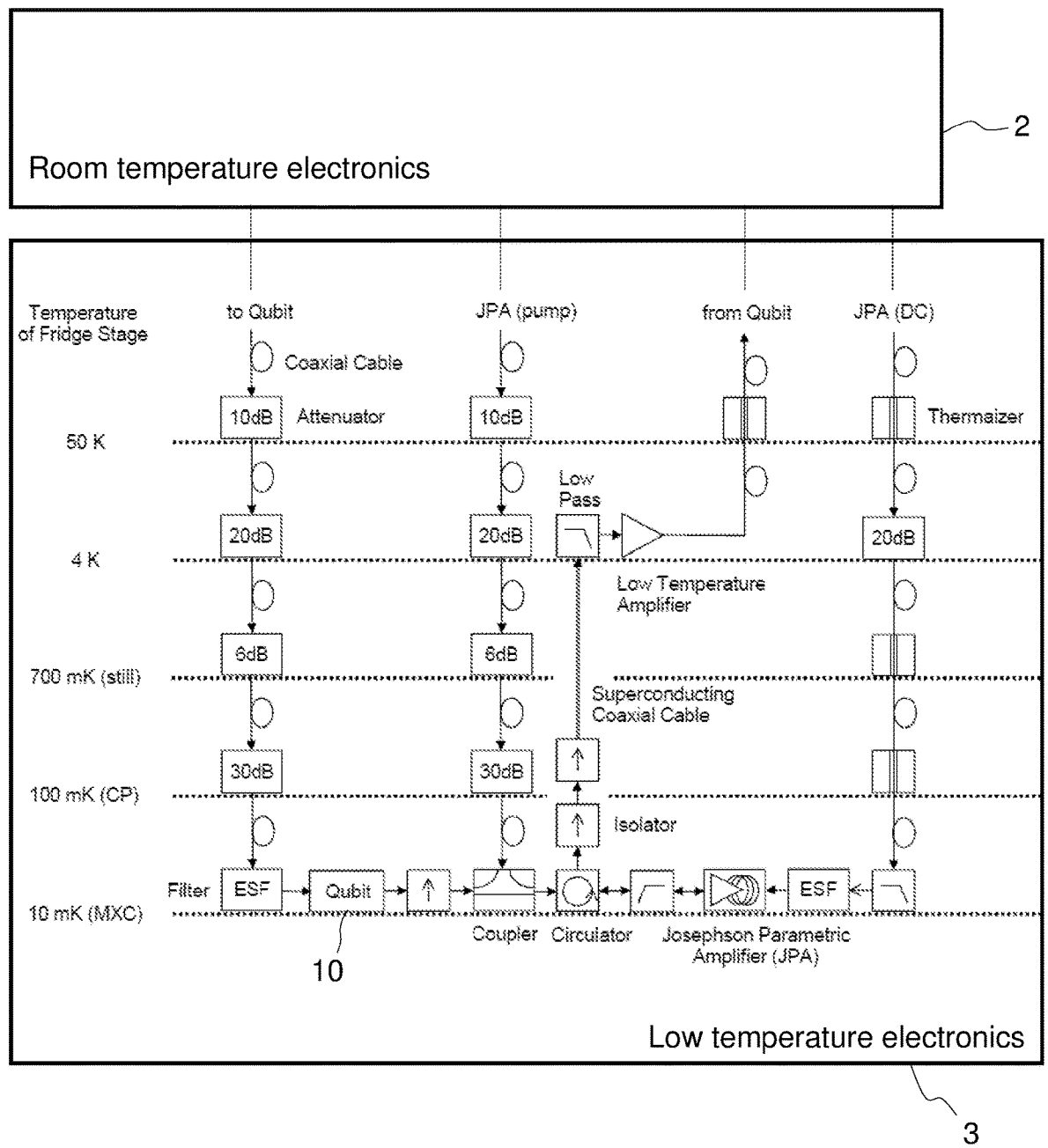

In the top-left corner of FIG. 3, the 'to Qubit' signal enters the cryostat and runs through attenuators on all the different cooling stages (50 K, 4 K, etc.) down to the 10 mK plate that supports the qubit(s). Attenuators are normally required to thermalize the coaxial conductors and keep the signal-to-noise ratio as high as possible when lowering the signal level, similar to the standard signal path for an initialization gate or any functional gate operation. In case of a read-out operation, the signal leaves the qubit read-out resonator to the right and reaches an isolator. The output signal continues via a directional coupler, where pump power for a Josephson parametric amplifier (JPA) is added, connected via a circulator and a filter to the JPA. The JPA enhances the signal by about 20 dB and reflects it back to the circulator. The circulator is routing the output signals up through the isolators and the low-pass filter to the low temperature amplifier (LTA). Thereafter, the signal leaves the cryostat (see 'from Qubit') to enter FIG. 2.

FIG. 4 shows a possible integrated solution for components as shown in the dashed box of FIG. 2. The circuit presented in this example may be digital, subject to a DAC-controlled VCO unit in the NCO, which allows integration onto a relatively small piece of silicon by standard CMOS technology. The first element (named "I/Q modulation state machine") replaces the AWG of FIG. 2. The state machine may optionally have an attached sample waveform memory ("Mem") 24, which can be preloaded with an arbitrary pattern. However, the waveforms could also be generated by the state machine directly, e.g., based on a formula, which is implemented in hardware and contains programmable registers for the variables. This way, the state machine creates I and Q data streams, which will be forwarded to the digital I/Q sideband modulator 214 (or simply "I/Q mixer") in FIG. 4.

The waveforms are used to drive any modulation schemes on the LO signal, namely amplitude, phase and frequency modulation. Functionally on a qubit system, this means that RF signals can be tuned to create gates for qubits and driving resonators to non-destructively readout qubits. If necessary, the interpolation (state machine 211) and the filters are used to interpolate wave points if the sideband modulator 214 operates at a different frequency and to remove spurious frequencies from the spectrum, respectively. The state machine 211 is controlled by the SIU 22, which sends commands and parameters, e.g., gate instructions for the qubit or to start a qubit read-out cycle.

The I/Q modulation state machine advantageously operates in real time. Since the SIU 22 has access to the ATR (FIG. 5), and the PTU 23 is driving the clock of the state machine, it can be synchronized to any frequency and/or phase and perfectly adjusted to the I/Q sideband modulator 214. This allows the state machine to create I and Q waveforms from DC with a very accurate control of the phase, which is advantageous for designing fast gate operations on the qubits, reducing cross talk and compensating for thermal drift effects, as well as improving coherence times.

In the example of FIG. 4, the microwave generator, termed "RF", includes a numerically controlled oscillator (NCO) and a control (Ctr) infrastructure to configure the unit. The Ctr allows to configure parameters such as the frequency and phase of the NCO and switch-over behavior if a parameter is changed when the unit is actively in operation. Examples are soft phase adjustments by changing the frequency for a defined time or a frequency change at zero-amplitude. The Ctr is controlled by the SIU 22 and the clock rooted by the PTU 23. This allows synchronization and control of many RF units distributed over an arbitrary distance. They all can be regulated to keep the controlled qubits coherent in the array. Therefore, the qubit array is the central timing target and all modulated RF generators are locking on the root phase, which itself depends on the central clock root (distributed system clock). The NCO is basically delivering the sine and its derivative (the cosine) of the configured frequency.

Optional output signals are possible to control processes that require high coherence. FIG. 2 depicts such an example on the read-out path, where the RF source is kept coherent with a vector RF source. The next unit on the RHS is a digital I/Q sideband modulator 214. This unit processes a quadrature modulation of the I and Q waveforms onto the LO signal, including sine and cosine signals, and delivers the digital RF signal waveform to the DAC 216. The sideband modulator 214 is configured by the SIU 22 and also receives the clock from the PTU 23. This feature allows to control frequency and phase adjustments of the incoming signals, such as the I and Q from the state machine and the LO from the sideband modulator 214. As a result, brisk phase changes caused by the modulation signals can be prevented. Also, the frequencies and phases of the different units can be coherently adjusted to gain a user signal with minimized amount of spurious frequencies at the DAC output. The last stage is a high-speed DAC 216, which also receives configurations and clock from the SIU 22 and PTU 23, respectively. The I/Q sideband modulator 214 may also forward information for the removal of spurious frequencies. The DAC 216 may be configured in modes to optimize its output to be used in higher Nyquist zones. Filters may be inserted at different positions to compensate sample rate differences of the digital waveforms, LO and RF signals.

Possible implementation and functions of the SIU 22 and PTU 23 are now described in more details.

FIG. 5 shows a sketch of a possible implementation of the PTU 23. The reference PLL 233 receives a periodic clock and a beacon, which is an integer multiple of the clock, from a central clock reference. The dashed signals denote signals mirrored back to the central clock root, which can be used to compensate drift effects in the clocking system. The system reference clock is distributed over the whole device via integer or fractional PLLs ("i/f PLL" in FIG. 5). The timing controller maintains the absolute timing register (ATR), as a local copy of the corresponding register in the central clock root. The central clock root is controlling the reset and configuration signals and the timing controller can send status information back to the central clock root.

Comments are in order. In some embodiments, the reset signal is always released together with the occurrence of a beacon signal. Also, if a new timing configuration has been sent by the central clock root, then it may be loaded to the ATR with the next appearance of the beacon. The beacon frequency will typically need be adjusted to allow the transfer of a full configuration before it gets active again. By counting the periods of the system reference clock frequency, the PTU 23 not only delivers a highly precise clock, but also an absolute system time. Such information is forwarded to all modules of the device, as depicted by the i/f PLLs, which receive clock and ATR. The i/f PLLs may possibly need to extend or truncate the ATR information depending on their output frequency. Both, the ATR and reference clock together ensure a system-wide coherent signal, which is strongly coherent and phase matched to the superconducting qubit hardware. This makes it possible to compensate for drift and other error effects in the modulated RF generators, which can act as remote PLLs for the controlled qubit.

A possible implementation of the SIU 22, i.e., the system control interface, is illustrated in FIG. 6. A central element is the real-time sequence controller, which receives clock and ATR from the PTU 23 and may also configure parts of the PTU 23. The SIU 22 further receives events and feedback information from the outside and status information from other modules on the device. The register file is used to program configurations, which may be used internally, but also by all the device-wide modules. The controller is reading instructions from the sequence memory system, which is the interface to the outside system controller. Such an outside controller may be used to program instructions such as series of qubit gates to be processed by the sequence memory, for later processing by the sequencer. The sequence memory may also contain dedicated sequences, as for example needed for the correction of a qubit, if needed. A unique feature of the real-time sequencer of FIG. 6 is that it is able to work on the time basis of the ATR, i.e., the distributed real-time reference. This allows the sequencer to place its actions (instructions) at the required point of time to the required system phase. Thus, the sequencer is working as a coherent processor. Within the real-time core, the SIU 22 also controls the configuration of the i/f PLLs in the PTU 23. Therefore, the system timings are not limited by the periodicity of the ATR driving clock, and even fractional periodicity can be synchronized over an arbitrary number of cycles. Interestingly, the processing instructions of this sequencer not only comprise an instruction code and depending parameters, but also an ATR-related time extended with a fractional part and it may forward such time-related tags to other components, which defines an absolute point of time when the command gets carried out in the hardware. Such a scheme makes it possible for local control functions to be moved from the qubits to the remote RF generation unit.

A quantum processing system in some embodiments may comprise one or more superconducting qubits and a qubit controller for controlling the one or more qubits. The qubit controller may include a radio frequency generation unit comprising electronic components, which are altogether configured to generate modulated RF signals. The controller also may include a phase locked loop unit maintaining a reference clock for two or more of the components of the RF generation unit, as well as a timing controller including an absolute timing register, the latter accessed by the reference clock, in operation. The qubit controller may include a sequencer coupled to the timing controller to synchronize the two or more of the components by maintaining a coherent signal for the two or more of the components, the coherent signal phase matched to the one or more qubits, so as to drive and/or read out the one or more qubits via modulated signals generated by the synchronized components, in operation. Related quantum computer hardware and methods of operation thereof may be also provided.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

LIST OF ABBREVIATIONS AND REFERENCES USED IN THE ACCOMPANYING DRAWINGS

| Component | Abbreviation/ Acronym | Numeral reference |
|---|---|---|
| Quantum processing system | — | 1 |
| Room temperature electronics | — | 2 |
| Low temperature electronics | — | 3 |
| Qubit | — | 10 |
| Qubit controller | — | 20 |
| Radio frequency generation unit | RF generation unit | 21 |
| Sequencer & instruction unit | SIU | 22 |
| Phase locked loop & timing unit | PTU | 23 |
| Sample waveform memory 24 | Mem. | 24 |
| In-phase/quadrature modulation state machine | I/Q modulation state machine | 211 |
| Digital in-phase/quadrature sideband modulator | I/Q sideband modulator | 214 |
| Digital-to-analog converter | DAC | 216 |
| Sequence memory system | — | 221 |
| Real-time sequence controller | — | 222 |
| Register file system | — | 223 |
| Phase locked loop unit | PLL | 233 |
| Application programming interface | API | 2211 |
| Absolute timing register | ATR | 2311 |
| Local signal | LO | — |
| Radio frequency signal | RF signal | — |
| Numerically controlled oscillator | NCO | — |

What is claimed is:

1. A quantum processing system comprising:
    one or more superconducting qubits; and
    a qubit controller for controlling the one or more superconducting qubits, the qubit controller comprising:
    a radio frequency generation unit, or RF generation unit, comprising electronic components configured to generate modulated radio frequency signals, or modulated RF signals,
    a phase locked loop unit configured to maintain a reference clock for two or more of said electronic components of the RF generation unit;
    a timing controller including an absolute timing register, the latter accessed by the phase locked loop unit for maintaining said reference clock, in operation; and
    a sequencer coupled to the timing controller to synchronize said two or more of the components by maintaining a coherent signal therefor, the coherent signal phase matched to the one or more qubits, so as for the qubit controller to drive and/or read out said qubits via modulated signals generated by the synchronized components, in operation.

2. The quantum processing system according to claim 1, wherein the RF generation unit comprises, as part of said electronic components, a single digital RF generator configured to generate RF signals, based on which said modulated RF signals are generated by the RF generation unit, in operation.

3. The quantum processing system according to claim 2, wherein the quantum processing device comprises two or more qubits, and the sequencer is further adapted to synchronize said components, so as for the modulated signals generated by the RF generation unit to drive and/or read out the two or more qubits time interleaved.

4. The quantum processing system according to claim 2, wherein the RF generation unit further comprises, as part of said components and in addition to said single digital RF generator:
    a digital in-phase/quadrature sideband modulator, coupled to the digital RF generator to modulate the RF signals generated by the latter in phase, frequency, and amplitude; and
    a digital-to-analog converter, coupled to the digital in-phase/quadrature sideband modulator to convert signals modulated by the later and thereby allow the qubit controller to drive and/or read out the one or more qubits, in operation.

5. The quantum processing system according to claim 4, wherein the RF generation unit further comprises, as part of said components, a hardware-implemented, real-time in-phase/quadrature modulation state machine, or I/Q modulation state machine, the latter coupled to the sideband modulator.

6. The quantum processing system according to claim 5, wherein the sequencer is further configured to synchronize said components by instructing the I/Q modulation state machine to generate, via the sideband modulator, I/Q waveforms used by the qubit controller to drive and/or read out the one or more qubits, in operation.

7. The quantum processing system according to claim 4, wherein the RF generation unit further comprises a numerically controlled oscillator, which is connected to the sideband modulator.

8. The quantum processing system according to claim 7, wherein the oscillator is designed so as to be reconfigurable on-the-fly.

9. The quantum processing system according to claim 1, wherein the system further includes an application programming interface.

10. The quantum processing system according to claim 2, wherein the qubit controller includes a real-time processing unit implementing each of the phase locked loop unit, the timing controller, and the sequencer.

11. The quantum processing system according to claim 2, wherein the sequencer, as implemented by the real-time processing unit, is designed to operate in real time on the time base of distributed system clocks.

12. The quantum processing system according to claim 2, wherein said components of the RF generation unit are implemented as discrete logic components, field programmable gate arrays, and/or dedicated gate arrays.

13. The quantum processing system according to claim 1, wherein the qubit controller is implemented as a single, integrated circuit chip.

14. The quantum processing system according to claim 1, wherein each of said one or more superconducting qubits is a fixed-frequency qubit of the transmon type.

15. A method for controlling a quantum processing system comprising one or more superconducting qubits, the method comprising, at a qubit controller:
    generating modulated radio frequency signals, or modulated RF signals, via electronic components of a radio frequency generation unit, or RF generation unit;
    maintaining a reference clock for two or more of said electronic components by accessing an absolute timing register;
    synchronizing said two or more of said components by maintaining a coherent signal therefor, the coherent signal phase matched to the one or more qubits; and driving and/or reading out said qubits via modulated signals generated by the synchronized components.

16. The method according to claim 15, wherein said reference clock is maintained by a phase locked loop unit.

17. The method according to claim 15, wherein said two or more of said components are synchronized by a sequencer coupled to a timing controller that includes said absolute timing register.

18. The method according to claim 15, wherein the quantum processing device comprises two or more qubits, and synchronizing said two or more of said components is carried out so as for the modulated signals generated by the RF generation unit to drive and/or read out the two or more qubits time interleaved.

19. The method according to claim 15, wherein said components are synchronized by instructing a hardware-implemented, real-time in-phase/quadrature modulation state machine to generate, via a digital in-phase/quadrature sideband modulator, I/Q waveforms used by the qubit controller to drive and/or read out the one or more qubits.

20. The method according to claim 15, wherein the qubit controller includes a real-time processing unit, so as for the qubit controller to operate in real time.

* * * * *